(12) United States Patent  
Smith et al.

(10) Patent No.: US 8,204,498 B1  
(45) Date of Patent: Jun. 19, 2012

(54) AUTOMATED CONTENT DOWNLOAD TOOL

(75) Inventors: Nathan A. Smith, Olathe, KS (US); Nicholas F. Burtner, Independence, MO (US); Ramprasad Koya, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 597 days.

(21) Appl. No.: 12/241,862

(22) Filed: Sep. 30, 2008

(51) Int. Cl.
*H04W 24/00* (2009.01)
*G06F 11/00* (2006.01)

(52) U.S. Cl. .......... 455/425; 455/423; 455/424; 714/32; 714/25; 714/46

(58) Field of Classification Search ................ 455/423, 455/424, 425; 714/32, 25, 46; 709/227
See application file for complete search history.

(56) References Cited

U.S. PATENT DOCUMENTS

| 2006/0142001 A1* | 6/2006 | Moisan et al. ................ 455/428 |
| 2006/0259629 A1* | 11/2006 | Usmani et al. ................ 709/227 |
| 2007/0255604 A1* | 11/2007 | Seelig ................................. 705/7 |
| 2010/0218044 A1* | 8/2010 | Roblett et al. .................. 714/32 |

* cited by examiner

*Primary Examiner* — Jinsong Hu
*Assistant Examiner* — Opiribo Georgewill (57) ABSTRACT

A system, method, and computer-readable media are provided for automatically evaluating the download of content retrieved from a content catalog to one or more mobile communications devices. The specific mobile communications devices and content that will be downloaded to the mobile communications devices may be identified by way of a web interface. This download information may be sent to an automatic test script, executed on a computing device that instructs various components throughout the download process. A remote device may receive instructions and download information from the automatic test script to initiate the download process, such that the content, retrieved from a wireless communications network, may be downloaded to the identified mobile communications device. After the download process has completed, a report that includes an indication of download results may then be generated and stored in a memory of the computing device.

13 Claims, 4 Drawing Sheets

AUTOMATED CONTENT DOWNLOAD TOOL

SUMMARY

The present invention is defined by the claims below. This summary is provided to introduce a selection of concepts in a simplified form that are further described below in the Detailed Description. This summary is not intended to identify key features or essential features of the claimed subject matter, nor is it intended to be used as an aid in isolation to determine the scope of the claimed subject matter.

Embodiments of the present invention provide systems, methods, and computer-readable media for, among other things, automatically testing a download process of content downloaded to a mobile communications device to determine whether the download was successful or not. The specific content to be downloaded and mobile communications devices may be identified by a user, as well as the time frame for downloading the content. Once downloaded, a report may be generated that contains, in one instance, a screenshot of the mobile communications device or of a display device that is coupled to the mobile communications device. If the download is not successful, information about the error may be extracted from the screenshot, such as the specific error message or error code, and may be used to generate the report. The report may then be stored in a memory component, and presented on a web interface for further analysis.

Accordingly, in one aspect, one or more computer-readable media having computer-useable instructions embodied thereon for performing a method of automatically evaluating a wireless download process that includes wirelessly downloading content to mobile communications devices from a wireless communications network is provided. The method includes receiving a set of test criteria that identifies one or more mobile communication devices that are to receive the content and indicates desired content whose downloadability is to be tested to determine whether the content can be successfully downloaded to the one or more mobile communication devices from the wireless communications network. Further, the method includes executing on a first computing device an automatic test script that communicates the test criteria to a remote device that is coupled to the one or more mobile communications devices. The remote device references the test criteria to automatically initiate a download of the content from the wireless communications network to the one or more mobile communications devices. Also, the remote device presents download results associated with the download of the content. The method also includes receiving at the first computing device an indication of the download results, and without user intervention, generating a report that includes the indication of the download results. Finally, the method includes at least temporarily storing the report in a memory of the first computing device.

In another aspect, one or more computer-readable media having computer-useable instructions embodied thereon for performing a method of automatically evaluating a wireless download process that includes wirelessly downloading content to mobile communications devices from a content catalog is provided. The method includes receiving a set of test criteria by way of an automatic test script executed on a first computing device, the test criteria indicating the content to be wirelessly downloaded, and one or more mobile communication devices onto which the content is to be wirelessly downloaded such that a success of the wireless download process can be determined. The method further includes accessing the content catalog to retrieve, by way of a wireless communications network, the content to be wirelessly downloaded to the one or more mobile communication devices, and automatically initiating a wireless download of the content from the content catalog to the one or more mobile communication devices. Also, the method includes sending an indication of download results associated with the wireless download to the first computing device for presentation on a display device.

In a further aspect, a system is provided for automatically evaluating a wireless download process that includes wirelessly downloading content to mobile communications devices from a wireless communications network. The system includes a first computing device that stores in one or more memory components an automatic test script that, when executed, automatically performs a process on one or more mobile communications devices. This process includes receiving an indication of download results associated with a wireless download of the content and presenting the download results on a display device. The system further includes a remote device coupled to the one or more mobile communications devices that references a set of test criteria received from the first computing device to download the content from the wireless communications network to determine whether the wireless download of the content was successful, wherein the set of test criteria identifies the one or more mobile communications devices that are to receive the content and indicates the content to be downloaded to the one or more identified mobile communications devices. Additionally, the system includes a data store coupled to the first computing device that stores a report that includes an indication of test results generated from the wireless download.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of the present invention is described with specificity herein to meet statutory requirements.

Although the terms "step" and/or "block" may be used herein to connote different components of methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AAA | Authorization, Authentication, and Accounting |
| CD-ROM | Compact Disk Read Only Memory |
| CDMA | Code Division Multiple Access |
| DVD | Digital Versatile Discs |
| FAX | Facsimile |
| iDEN | Integrated Digital Enhanced Network |
| LAN | Local Area Network |
| PDA | Personal Digital Assistant |
| RAM | Random Access Memory |
| ROM | Read Only Memory |
| TV | Television |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things, a method, system, or computer-program product. Accordingly, the embodiments may take the form of a hardware embodiment, or an embodiment combining software and hardware. In some embodiments, the present invention takes the form of a computer-program product that includes computer-useable instructions embodied on one or more computer-readable media.

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Having briefly described an overview of exemplary embodiments of the present invention, an exemplary communications environment 100 suitable for the present invention is now described. Referring to the drawings in general, and initially to FIG. 1 in particular, an exemplary operating environment for implementing embodiments of the present invention is shown and designated as communications environment 100. Exemplary communications environment 100 is but one example of a suitable environment and is not intended to suggest any limitation as to the scope of use or functionality of the present invention. Neither should the communications environment 100 be interpreted as having any dependence or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

Figure 1:
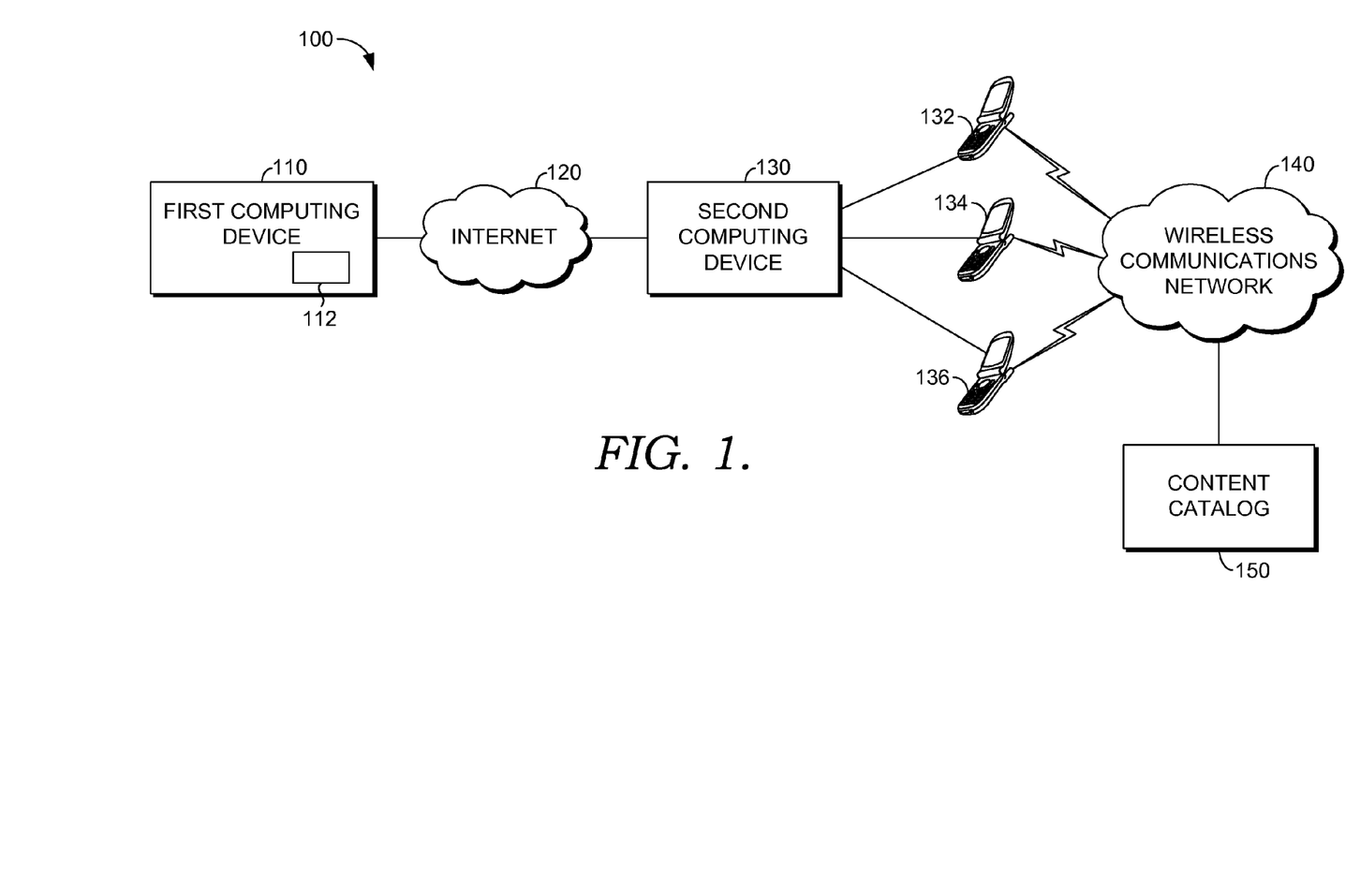
FIG. 1 is a schematic view of an exemplary communications environment suitable for use in implementing embodiments of the present invention.

With continued reference to FIG. 1, a first computing device 110 may include one or more components not shown in FIG. 1, including, but not limited to, a bus, memory, one or more processors, one or more presentation components, input/output (I/O) ports, I/O components, or a power supply. As shown, the first computing device 110 includes a report generator 112 that is capable of receiving data (e.g., screenshots), in some embodiments interpreting the data, and generating a report for presentation on a display device. The inventors hereof recognize that such is the nature of the art and reiterate that the diagram of FIG. 1 is merely illustrative of an exemplary communications environment that can be used in connection with one or more embodiments of the present invention. Distinction is not made between such categories as "workstation," "server," "laptop," "handheld device," etc., as all are contemplated to be within the scope of FIG. 1 and reference to "computer" or "computing device."

Further, the first computing device 110 may be any type of computing device, and may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

The first computing device 110 and a second computing device 130 may, in some embodiments, communicate by way of Internet 120. The communication may be wireless in some embodiments, and thus the two devices 110 and 130 may be physically located in different regions or areas of the country, or even of the world. Generally, the second computing device 130 is capable of receiving a set of test criteria from the first computing device, in one embodiment by way of an automatic test script, and based on the criteria, retrieving content to download to one or more mobile communications devices so that the downloadability of the content may be tested on the devices.

In reference to the second computing device 130, distinction is not made between such categories as "workstation," "server," "laptop," "handheld device," etc., as all are contemplated within the scope of FIG. 1 and reference to "computer" or "computing device." Further, the second computing device 130 may be any type of computing device and may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network, such as Internet 120.

Mobile communications devices 132, 134, and 136 are configured to receive content whose downloadability may be tested so that a report can be generated for further analysis of the download process. The mobile communications devices 132, 134, and 136 may be any type of mobile communications device, such as, but not limited to, a mobile phone, a personal digital assistant (PDA), or other handheld device that is capable of communicating with a communications network, such as wireless communications network 140. It should be noted that any number of mobile communications devices may be coupled to the second computing device 130. Three mobile communications devices are illustrated in the embodiment of FIG. 1, but one of ordinary skill in the art will certainly appreciate that more or less than three may be utilized while still performing the methods and systems of the present invention.

With continued reference to FIG. 1, screenshots may be retrieved (e.g., screen grabs) by the second computing device 130 after a download of content has been completed to retrieve download information regarding the download. In one embodiment, the mobile communications devices download content from a content catalog 150 by way of a wireless communications network 140. A plurality of content may be stored in the content catalog 150 for purchase and download by users of a particular provider. In one embodiment, more than one provider may allow users to purchase and download content from the content catalog 150. The content catalog 150, in one embodiment, may take the form of a data store, such that it stores a plurality of content, but allows for retrieval of that content when content is requested or purchased.

Figure 2:
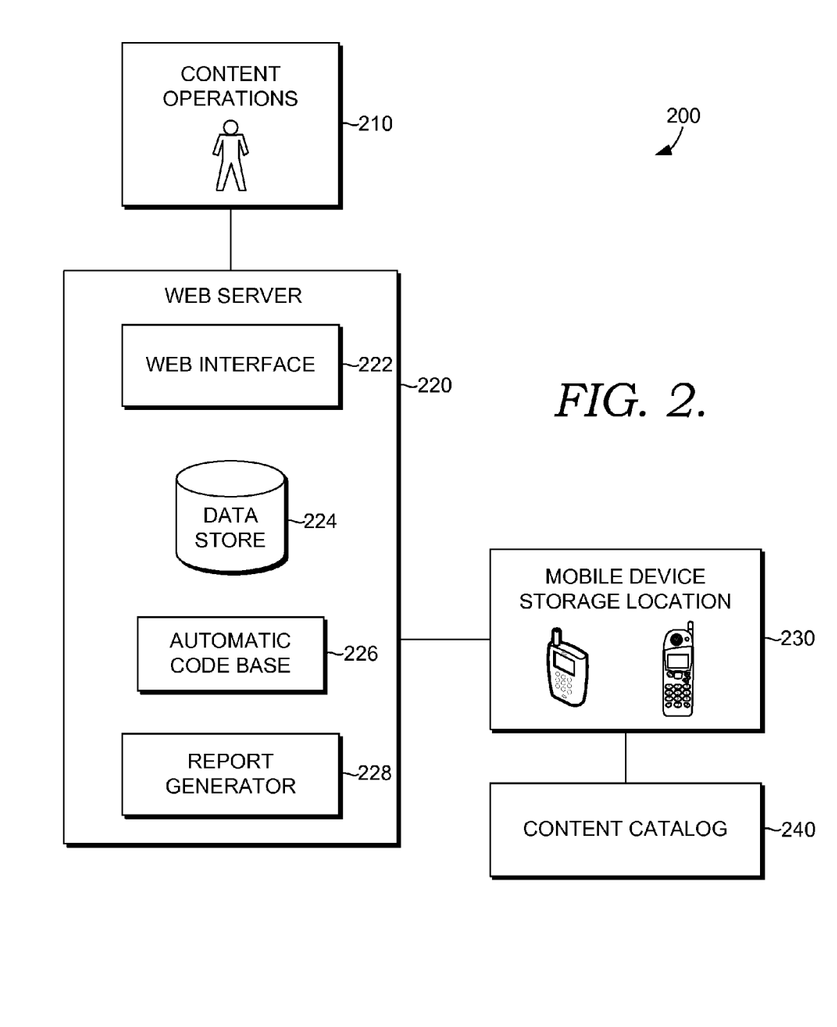
FIG. 2 is a block diagram of an exemplary system that performs a method of automatically evaluating a wireless download process that includes wirelessly downloading content to mobile communications devices and that is suitable for operation in accordance with embodiments of the present invention.

Turning now to FIG. 2, a block diagram of an exemplary system 200 that performs a method of automatically evaluating a wireless download process that includes wirelessly downloading content to mobile communications devices and that is suitable for operation in accordance with embodiments of the present invention is provided. Initially, system 200 includes content operations 210 that may be capable of determining and inputting into a web interface 222 an identification of one or more mobile communications devices onto which content is downloaded, and an indication as to the specific content that will be downloaded onto the mobile communications devices so that the downloadability of the content may be evaluated.

The content may be inputted by entering a product code or unique identification number that corresponds to the specific content. The mobile communications devices may also be identified by a unique identification number, or may be identified by a model number corresponding to the device. In some embodiments, content operations 210 may be an automated device, such as a computing device, and may be any type of computing device, such as, but not limited to, a handheld device, a laptop, a server, or the like. Content operations 210 may also be operated by a user (e.g., person) who determines what information to enter into the web interface 222.

In addition to entering information regarding an identification of one or more mobile communications devices and an indication of specific content to download onto the identified mobile communications devices, content operations 210 may also specify a time frame for which the download of content to the one or more mobile communications devices is to occur. For example, sample time frames may include the current time, a specific time, or a default time (e.g., 2:00 AM). This allows a content operator, for example, to make the determination that certain content downloads (e.g., if there are a plurality of downloads to occur on many mobile communications devices at the same time) are to take place at 2:00 AM, for example, which may be preferable given that download traffic may be lighter at that time than during the day.

Once inputted into the web interface 222, this information may be stored in a data store, such as data store 224. While one data store is illustrated in FIG. 2, it will be understood that any number of data stores may be utilized to store various types of information. In addition to storing the entered set of test criteria, data store 224, in some embodiments, may also store generated reports that contain information about the result of a download to the one or more mobile communications devices. An automatic code base 226 may contain automatic test scripts that are programs or sequences of instructions that are interpreted or carried out by another program, such as an automatic download of content onto one or more mobile communications devices, and in many embodiments, do not require user interaction in order to execute and carry out the intended process or function. It should be noted that one automatic test script may be used for multiple mobile communications devices, but in some embodiments, each mobile communications device model may require a different script, as the download process may vary from device to device.

Automatic test scripts may be flexible and may be capable of being executed across many models and types of mobile communications devices. In one instance, the scripts may be capable of being executed on CDMA Java based handsets, and in another instance, may be executed over an Integrated Digital Enhanced Network (iDEN). Other mobile telecommunications systems, however, may be used with the present invention, other than those listed, and all are contemplated to be within the scope of the present invention. Further, various types of devices may be tested using the present invention such as, but not limited to, cell phones, PDAs, and other handheld devices, in addition to devices running on various operating systems such as Palmer and Windows Mobile.

Data entered into the web interface 222, such as an identification of one or more mobile communications devices, an indication of specific content to download onto the identified mobile communications devices, and the time frame that the content is to be downloaded, may be transferred to the automatic code base 226 and used to initiate the script. The purpose of the web interface 222 is to identify the set of test criteria so that the automatic test script may perform an automatic process of evaluating the successfulness of a download attempt. In order to run, the script may require download information, which is contained within the set of test criteria, and which is vital to the script's performance so that the script may instruct other components what to do. As mentioned previously, the set of test criteria may be stored in data store 224.

In one instance, the script executes prior to the time frame for download of content entered into the web interface 222, as indicated by the download information. In another instance, the script may not execute until the time indicated by the set of test criteria. For example, the content operations 210 may specify that the content is not to be downloaded to the one or more mobile communications devices until 2:00 AM when there is less Internet traffic, allowing for faster downloads. In this scenario, the script may not execute until 2:00 AM, or may execute at an earlier time (e.g., earlier than 2:00 AM), but the download of content may not actually occur until 2:00 AM (e.g., download held until specified time).

Collectively, the web interface 222, the data store 224, the automatic code base 226, and the report generator 228 may be referred to as a web server 220. This web server 220 may be a computing device, such as the first computing device 110 of FIG. 1. In one embodiment, the web interface 222 may be a separate component and may not be considered to be a part of the web server 220 or the first computing device 110 of FIG. 1, in addition to the other components listed above. It will be understood that any combination of components shown in FIG. 2 may be referred to as the web server 220, a first computing device, or a second computing device.

As mentioned above, the data store 224 or another memory component associated with the web server 220 may store the automatic test scripts that, when executed, automatically perform a process on the one or more mobile communications devices. When executed, the automatic test scripts perform a process that may include receiving an indication of download results associated with a wireless download of the content. This indication may include error data which may be derived from screenshots of the mobile communications devices or a device display coupled to the mobile communications devices. These download results may be presented on a display device so that a user, such as personnel associated with the content operations 210 may interpret and evaluate the download results.

Mobile device storage location 230 may be physically located at or near the location of the web server, or may be located elsewhere, such as in a different city, state, or even country in some instances. The mobile device storage location 230 is the physical location of the mobile communications devices that may receive downloads of content, such that the downloadability of the content may be tested and evaluated. The mobile device storage location 230, in some embodiments, may also include a server that authenticates a user, and that may be responsible for billing. In one embodiment, the server takes the form of an Authentication, Authorization, and Accounting (AAA) server. A computing device, such as second computing device 130 of FIG. 1, may be located at the mobile device storage location 230 and may be coupled to the mobile communications devices through either a wired or wireless connection. By way of the script, the computing device at this location may reference download information (e.g., set of test criteria) sent by the script or the first computing device in order to initiate the download of content to the mobile communications devices.

Content may be stored in a content catalog, such as content catalog 240. Content may include any type of content that may be downloaded to a mobile communications device including, but not limited to, ring tones, games, screensavers, multimedia, or the like. In some instances, the content catalog 240 may be maintained by a wireless communications service provider. Each content, which may take the form of a file, in the content catalog 240 may be represented by a unique identification number or a product ID. The content catalog 240 may be a server, and may store upwards of 100,000 files at any given time. New content may be added by uploading it to the content catalog 240. This may be done by the content operations 210, for example. The mobile device storage location 230 or a component thereof may request certain content to be retrieved from the content catalog 240 and downloaded to one or more mobile communications devices, as described above.

Once the content has been downloaded, it may be determined whether the download was successful or not, and this may be done in many ways. For example, one or more screenshots (e.g., screen grab) may be obtained from the display of the mobile communications devices or even the display of the second computing device (e.g., second computing device 130 of FIG. 1), which may indicate if the download was successful or not, and in the case that it was not successful, why it was not successful. Report generator 228 may, in one embodiment, utilize information (e.g., error messages or error codes) from the screenshot and generate a report based on this information.

Because this system is automated, the automatic test scripts instruct the server or computing device (e.g., remote device, second computing device) to perform a screen grab and take screenshots from the mobile communications devices or a display device coupled to the mobile communications devices. The automatic test scripts also allow for an automatic derivation of text that is shown on the display following the download attempt to determine that the download attempt was either successful or unsuccessful. In the event of an unsuccessful attempt, the specific error message may be captured from the display and used to generate the report, which may be performed by the report generator 228, for example.

Once generated, the report may be uploaded to the web interface 222 so that personnel of the wireless service provider (e.g., content operations 210) may be able to view the report and further analyze the results, determining why a particular download may not have been successful and specifically what can be changed so that there is a successful outcome in the future. In some embodiments, the report may include both images taken from screenshots, and error text that may be derived from the screenshots.

Figure 3:
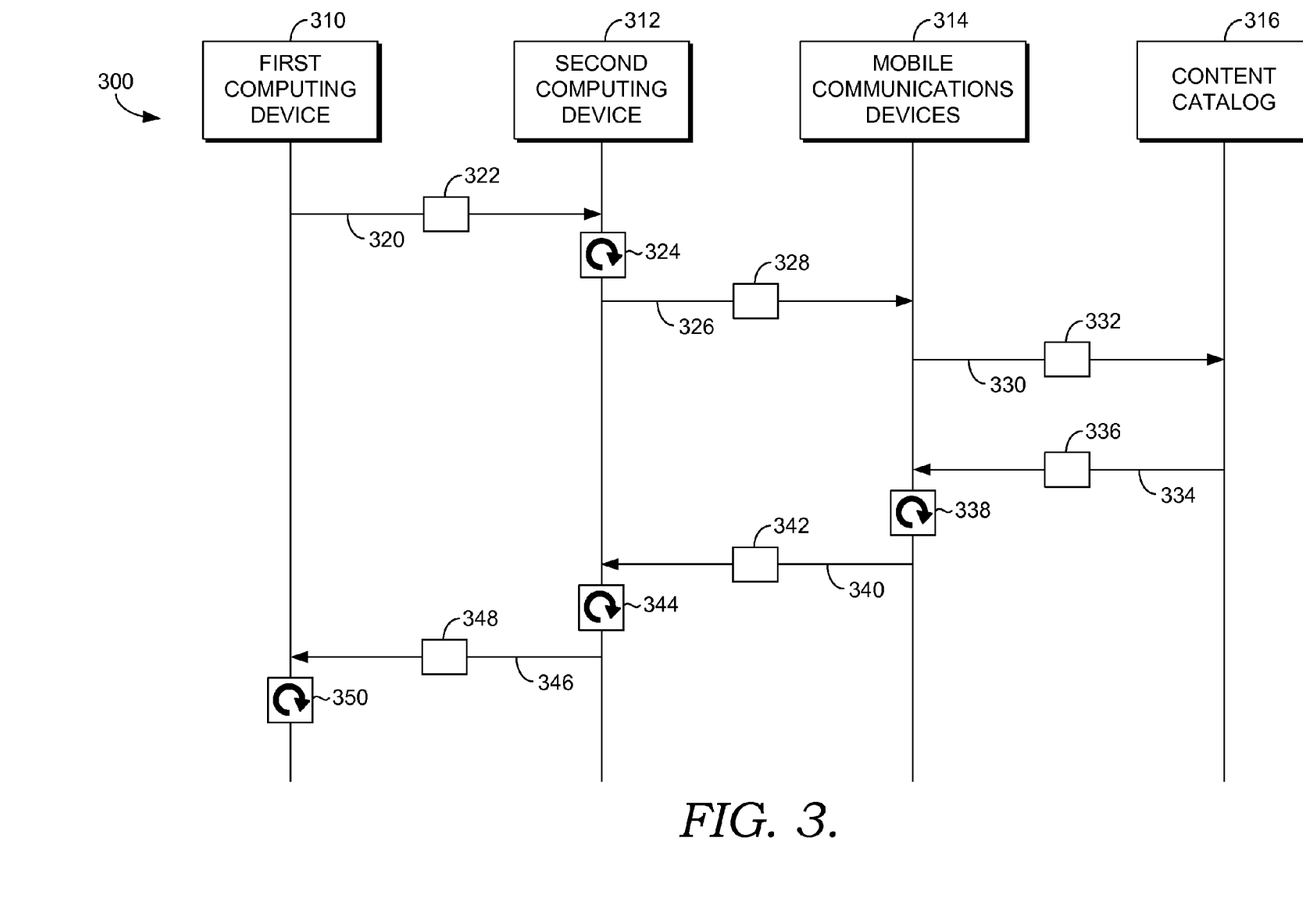
FIG. 3 depicts an illustrative flow diagram of a method for automatically evaluating a wireless download process that includes wirelessly downloading content to mobile communications devices to test the downloadability of the content, in accordance with an embodiment of the present invention.

FIG. 3 depicts an illustrative flow diagram of a method 300 for automatically evaluating a wireless download process that includes wirelessly downloading content to mobile communications devices to test the downloadability of the content, in accordance with an embodiment of the present invention. Initially, a first computing device 310 may receive a set of test criteria that may have been entered into a web interface. A content operator, for example, may have the responsibility of determining which mobile communications devices are to receive the content for download and the specific content whose downloadability is to be tested. Furthermore, a time frame that the content download is to take place may also be entered into the web interface. The time frame may include one or more of the current time, a specific time (e.g., 3:00 PM, 8:00 AM), or a default time (e.g., 2:00 AM), which may be preset to a time when there is typically a low volume of Internet traffic allowing for faster downloads.

Collectively, the specific mobile communications devices, the content, and the time of download may be referred to as a set of test criteria. The set of test criteria may be sent to a first computing device so that it may be used by an automatic test script to evaluate and test the success of content downloaded to one or more mobile communications device. The automatic test script may execute, and the first computing device 310, at step 320, may send the set of test criteria 322 to a second computing device 312. In one embodiment, the first computing device 310 may also send logon information to the second computing device 312 so that the first computing device 310 can be authenticated and therefore authorized to cause an automatic download of content to the one or more mobile communications devices 314.

At step 324, the second computing device 312 processes the set of test criteria and the login information, and subsequently determines whether the first computing device 310 can be authenticated. In one embodiment, the second computing device 312 includes an AAA server that, in addition to authenticating and authorizing the first computing device 310, also provides for accounting services so that the service provider attempting to access the second computing device 312 can be appropriately billed. The second computing device 312 may then, at step 326, send an indication 328 of the content to be downloaded to one or more mobile communications devices 314, or those that were identified in the set of test criteria 322.

The identified mobile communications devices 314 may, at step 330, then send a request 332 to a content catalog 316 for specific content that was identified in the set of test criteria 322 to be downloaded onto the mobile communications devices 314. The mobile communications devices 314 may request and attempt to download the content as if a test were not being performed. Accordingly, a fee may be associated with a specific content download, and this cost may be billed (e.g., as accounted for by an AAA server) to the service provider performing the download tests.

As previously mentioned, content stored in the content catalog 316 may be associated with a product identification or unique identification number. For example, the game Tetris may be associated with a product identification number of 1234. Using this example, if it is desired that Tetris be downloaded on a specific device, the product number 1234 and the model or identification number of the mobile communications device to which Tetris is to be downloaded, such as LG 400, may be entered into the web interface 222 of FIG. 2.

The content catalog 316 then may proceed to locate the specified content requested by the mobile communications devices 314 and send the content 336 back to the mobile communications devices 314, at step 334, where a download attempt is made to the devices 314, as shown at step 338. In an exemplary embodiment, the content is sent through a wireless communications network to the mobile communications devices 314. In an alternative embodiment, the content catalog 316 and the mobile communications devices 314 may be coupled so that a wired connection is implemented, thus not requiring a wireless communications network.

At step 340, the mobile communications devices 314 may send an indication 342 to the second computing device 312 as to whether the download was successful or not. In an exemplary embodiment, a separate indication may be sent for each piece of content, and additionally for each mobile communications device 314 to which content has been downloaded. The indication 342 may, in some embodiments, include a screenshot of the displays of the mobile communications devices 314, which may specify download results, such as whether or not the download was successful. Error codes may be displayed on the mobile communications devices 314 if the download was not successful. At step 344, the second computing device 312, in one embodiment, may take a screenshot (e.g., screen grab) of a display device (e.g., monitor), which may be coupled to the mobile communications devices 314.

Error data may be extracted from the screenshots (e.g., screenshots of the mobile communications devices' displays or the second computing device's display), if applicable. The error data, along with screenshots 348, may be sent at step 346 to the first computing device 310, where the first computing device 310 may generate a report (e.g., by report generator 228 of FIG. 2) that includes all of the error data and screenshots. There may be a separate report generated for each mobile communications device 314, or for each piece of content that has been downloaded. It is considered to be within the scope of the present invention that any and all types of error information may be included in a report. Once received, the first computing device 310 may present the report at step 350 on a web interface for a content operator or other personnel to review and make further assessments as to the reasons why a download attempt may have failed.

Figure 4:
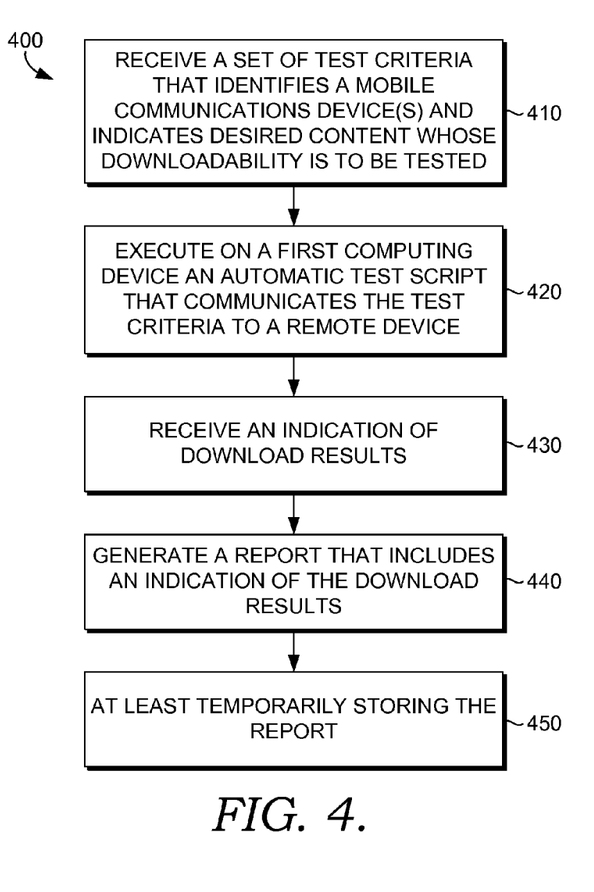
FIG. 4 depicts an illustrative flowchart for performing a method of automatically evaluating a wireless download process that includes wirelessly downloading content to mobile communications devices from a wireless communications network, in accordance with an embodiment of the present invention.

Turning now to FIG. 4, an illustrative flowchart is shown for performing a method 400 of automatically evaluating a wireless download process that includes wirelessly downloading content to mobile communications devices from a wireless communications network, in accordance with an embodiment of the present invention. It should be noted that FIG. 4 illustrates a method of automatically evaluating a wireless download process from the point of view of a first computing device, such as the first computing device 110 of FIG. 1, as will become apparent with the description below.

Initially, at a first step 410, a set of test criteria may be received that identifies one or more mobile communications devices that are to receive content, and that indicates the content that is to be downloaded onto the one or more mobile communications devices. It should be noted that all mobile communications devices available may be tested, or only a select number of devices may be tested. The downloadability of the content may be tested to determine whether it can be successfully downloaded to the mobile communications devices. This may provide a higher success rate of content downloads initiated by subscribing users. In one embodiment, the content may be stored in a content catalog, such as content catalog 316 of FIG. 3, and may be downloaded via a wireless communications network. The download information contained in the set of test criteria may have been entered into a web interface, wherein the criteria is then transferred to the first computing device.

The set of test criteria may include various information regarding the download of the content as describe above, and may also include an indication of when the content is to be downloaded. Exemplary times may include the current time, a specific time, or a default time, such as 2:00 AM when Internet traffic may be light. Advantageously, allowing for a time to be defined as to when content is downloaded provides great flexibility for a service provider.

Next, at a step 420, an automatic text script is executed on a first computing device. The automatic test script communicates the set of test criteria to a remote device, such as second computing device 130 of FIG. 1, which may be coupled to the mobile communications devices. The remote device may reference the set of test criteria to automatically initiate a download of the content from the wireless communications network. The content, in one embodiment, is downloaded directly to the mobile communications devices as it normally would if a customer were attempting to download content. As previously described, the content may be stored in a server, such as the content catalog 150 of FIG. 1, where each piece of content is associated with a product number or a unique identification number. The content may include, but is not limited to, ring tones, games, screensavers, or multimedia files. It will be appreciated by one or ordinary skill in the art that other types or form of content are well within the scope of the present invention.

At a step 430, the first computing device may receive an indication of the download results from, in one instance, the remote device. The indication of the download results may include many embodiments of results. In one instance, the indication of the download results may include a screenshot (e.g., screen grab) of a display, which may be a display of a mobile communications device, or of a display device (e.g., monitor) that is coupled to the mobile communications device.

With continued reference to FIG. 4, a report may be generated at a step 440 that includes an indication of the download results. In some embodiments, the report is generated without user intervention, as a result of the executed automatic test script. Finally, the report may be stored, at least temporarily, in a memory device associated with the first computing device at step 450. The memory may be incorporated within the first computing device, such as an internal storage device, or may be a separate storage device, such as data store 224 illustrated in FIG. 2. The report may, in some instances, be displayed on a display device that is coupled to the first computing device allowing a user to read and interpret the download results, if necessary.

As described above, the remote device may include an authentication server, such as an AAA server, that requires logon information to authenticate, authorize, and bill (e.g., accounting) a user, such as a wireless service provider. Here, the first computing device may send logon information to the remote device so that the automatic test scripts may execute on the remote device and further, on the mobile communications devices.

Figure 5:
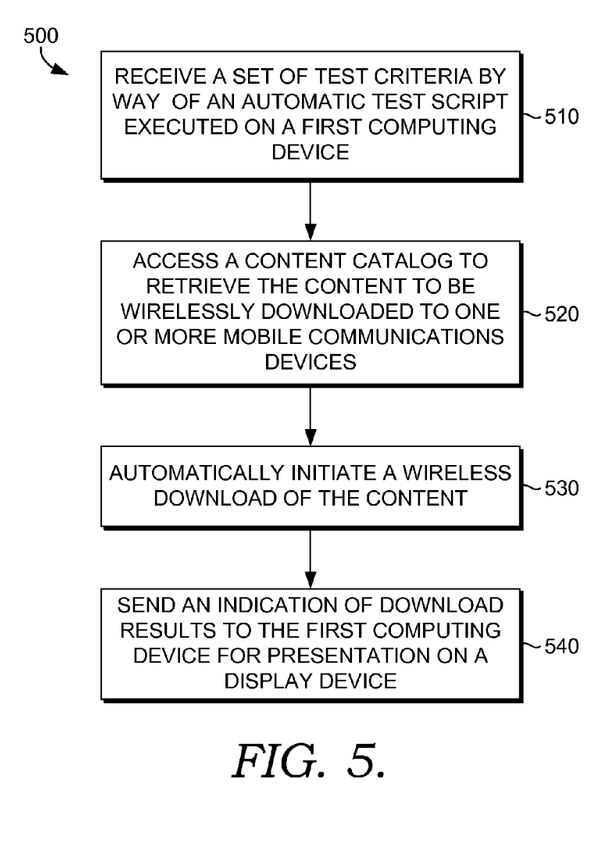
FIG. 5 depicts an illustrative flowchart for performing a method of automatically evaluating a wireless download process that includes wirelessly downloading content to mobile communications devices from a content catalog, in accordance with an embodiment of the present invention.

FIG. 5 depicts an illustrative flowchart for performing a method 500 of automatically evaluating a wireless download process that includes wirelessly downloading content to mobile communications devices from a content catalog, in accordance with an embodiment of the present invention. FIG. 5 illustrates a method of automatically evaluating a wireless download process from the point of view of a remote device, which will become apparent from the description below. Here, the content may include any type or form of content that may be downloaded to a mobile communications device, and in some embodiments, may include ring tones, screensavers, games, or multimedia files (e.g., music, videos). In some embodiments, content may even include applications.

Initially, a set of test criteria is received by way of an automatic test script that is executed on a first computing device, shown at step 510. The set of test criteria may include the content that is to be wirelessly downloaded to mobile communications devices and the mobile communications devices to which the content is to be wirelessly downloaded. The content is downloaded so that the download success of the content may be determined. In addition, the set of test criteria may also include timing information as to when the download is to occur. Options may include, but are not limited to, the current time, a specific time, or a default time, such as 2:00 AM, when Internet traffic may be at its lightest.

The automatic test script, or a set of instructions on how the various components of the system are to download, in this embodiment, execute on a first computing device, but it will be understood by one of ordinary skill in the art that the automatic test script may execute on a variety of components in various embodiments. The automatic test script may execute and not require user interaction. The set of test criteria may first be received through a web interface that allows for the input of criteria such as those described above. From the web interface, the first computing device may receive the criteria and allow for the automatic test script to access the criteria in order to execute. In some embodiments, a different automatic test script may be required for each type or model of mobile communications devices, as each may initiate and complete the download process in a different way. When new mobile communications devices need to be tested for the downloadability of certain content, a new automatic test script may be created, or alternatively, an existing script may be used if the steps or download instructions are consistent with those of another mobile communications device associated with that existing script.

At step 520, a content catalog is accessed by a remote device to retrieve the content, by way of a wireless communications network, to be wirelessly downloaded to the one or more mobile communications devices. A wireless download of the content is automatically initiated at step 530, wherein the content is downloaded from the content catalog to the one or more mobile communications devices. Next, at step 540, an indication of download results associated with the wireless download is sent to the first computing device and may be presented on a display device. In one embodiment, the display device is the same device that is associated with the web interface. The indication of download results may include, in one embodiment, screenshots of a display device coupled to the mobile communications devices, or of the displays of the mobile communications devices themselves. The screenshots indicate whether or not the content was downloaded successfully, and in some embodiments, may also include error information (e.g., error codes) that corresponds to various errors or reasons why the content was not downloaded successfully.

In some embodiments, the remote device may require the first computing device to be authenticated before the remote device initiates the automatic download of content. For instance, the first computing device or any other component may send logon information to the remote device or one of its components to initiate a logon request. An AAA server may be a component used to authenticate the first computing device and may also be responsible for accounting or billing of the entity (e.g., wireless service provider) accessing the remote device. Once the logon information is received, which may include a username and password, the component responsible for authenticating the user may determine that the logon request is valid. The first computing device or other user may then be authenticated to the remote device to execute the automatic test script so that the content to be downloaded may be requested by the remote device or the mobile communications devices, depending on the embodiment used.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method of automatically evaluating a wireless download process that includes wirelessly downloading content to mobile communications devices from a wireless communications network, the method comprising:
   at a first computing device, receiving a set of test criteria that,
   (1) identifies one or more mobile communications devices that are to receive the content, wherein the content includes one or more of a ring tone, a game, a screen saver, or a multimedia file,
   (2) indicates desired content whose downloadability is to be tested to determine whether the content can be successfully downloaded to the one or more mobile communications devices from the wireless communications network, and
   (3) indicates a time frame for which the wireless download process of the content to the one or more mobile communications devices is to occur, which includes one or more of a current time, a specific time, or a default time;

executing on the first computing device an automatic test script that communicates the test criteria to a remote device that is coupled to the one or more mobile communications devices, (1) wherein the remote device references the test criteria to automatically initiate a download of the content from a content catalog by way of the wireless communications network to the one or more mobile communications devices, and (2) wherein the remote device presents download results associated with the download of the content by automatically deriving text shown on a display coupled to at least one of the one or more mobile communications devices to determine whether the download attempt was successful or unsuccessful;

receiving at the first computing device an indication of the download results, the indication of the download results including a screenshot of the display coupled to at least one of the one or more mobile communications devices that has received the desired content;

without user intervention, generating a report, based, at least, on the screenshot, that includes the indication of the download results; and at least temporarily storing the report in a memory of the first computing device.

2. The media of claim 1, wherein the set of test criteria further includes an indication of when the automatic test script is to be executed on the first computing device.

3. The media of claim 2, wherein the indication of when the automatic test script is to be executed includes executing the automatic test script at one or more of the current time, a specified time, or a default time.

4. The media of claim 1, wherein the set of test criteria is received from a web interface that contains inputted download information defining the set of test criteria.

5. The media of claim 1, further comprising sending login information to the remote device for authentication to execute the automatic test scripts on the one or more mobile communications devices.

6. The media of claim 1, wherein the report is presented on a display device coupled to the first computing device.

7. The media of claim 1, wherein the content is stored in a content catalog comprising a plurality of content files, and wherein each content file is associated with a unique identification number.

8. One or more non-transitory computer-readable media having computer-useable instructions embodied thereon for performing a method of automatically evaluating a wireless download process that includes wirelessly downloading content to mobile communications devices from a content catalog, the method comprising:

at a remote device, receiving a set of test criteria by way of an automatic test script executed on a first computing device, the test criteria indicating:

(1) the content to be wirelessly downloaded, and (2) one or more mobile communications devices onto which the content is to be wirelessly downloaded such that a success of the wireless download process can be determined, and (3) a time frame for which the wireless download process of the content to the one or more mobile communications devices is to occur, which includes one or more of a current time, a specific time, or a default time;

at the remote device coupled to the one or more mobile communications devices, accessing the content catalog to retrieve, by way of a wireless communications network, the content to be wirelessly downloaded to the one or more mobile communications devices, wherein the content includes one or more of a ring tone, a game, a screen saver, or a multimedia file;

automatically initiating a wireless download of the content from the content catalog to the one or more mobile communications devices;

automatically deriving text shown on a display coupled to at least one of the one or more mobile communications devices to determine whether the download attempt was successful or unsuccessful; and sending an indication of download results associated with the wireless download to the first computing device for presentation on a display device, the indication of the download results including a screenshot of the display coupled to at least one of the one or more mobile communications devices that has received the desired content.

9. The media of claim 8, further comprising receiving logon information to initiate a logon request.

10. The media of claim 9, further comprising:

determining that the logon request is valid; and authenticating the first computing device to the remote device to execute the automatic test script so that the content to be downloaded can be requested by the remote device.

11. A system for automatically evaluating a wireless download process that includes wirelessly downloading content to mobile communications devices from a wireless communications network, the system comprising:

a first computing device that stores in one or more memory components an automatic test script that, when executed, automatically performs a process on one or more mobile communications devices, the process including, (1) receiving an indication of download results associated with a wireless download of the content, the indication of the download results including a screenshot of a display coupled to at least one of the one or more mobile communications devices that has received the desired content, and (2) presenting the download results on a display device;

a remote device coupled to the one or more mobile communications devices that references a set of test criteria received from the first computing device to download the content from a content catalog by way of the wireless communications network to determine whether the wireless download of the content was successful, (1) wherein the set of test criteria identifies the one or more mobile communications devices that are to receive the content that includes one or more of a ring tone, a game, a screen saver, or a multimedia file, indicates the content to be downloaded to the one or more identified mobile communications devices, and indicates a time frame for which the wireless download process of the content to the one or more mobile communications devices is to occur, which includes one or more of a current time, a specific time, or a default time, and (2) wherein the remote device automatically derives text shown on the display coupled to at least one of the one or more mobile communications devices to determine whether the download attempt was successful or unsuccessful; and a data store coupled to the first computing device that stores a report that includes an indication of test results generated from the wireless download.

12. The system of claim 11, further comprising a web interface that receives inputted download information that comprises the set of test criteria used to define the one or more mobile communications devices that are to receive the content and the content to be downloaded to the one or more mobile communications devices.

13. The system of claim 11, wherein the indication of the test results includes error data derived from information on the screenshots.

* * * * *